L. J. CAMPBELL.
FABRIC FOR TIRES.
APPLICATION FILED MAY 25, 1914.
1,207,709.
Patented Dec. 12, 1916.
2 SHEETS—SHEET 1.
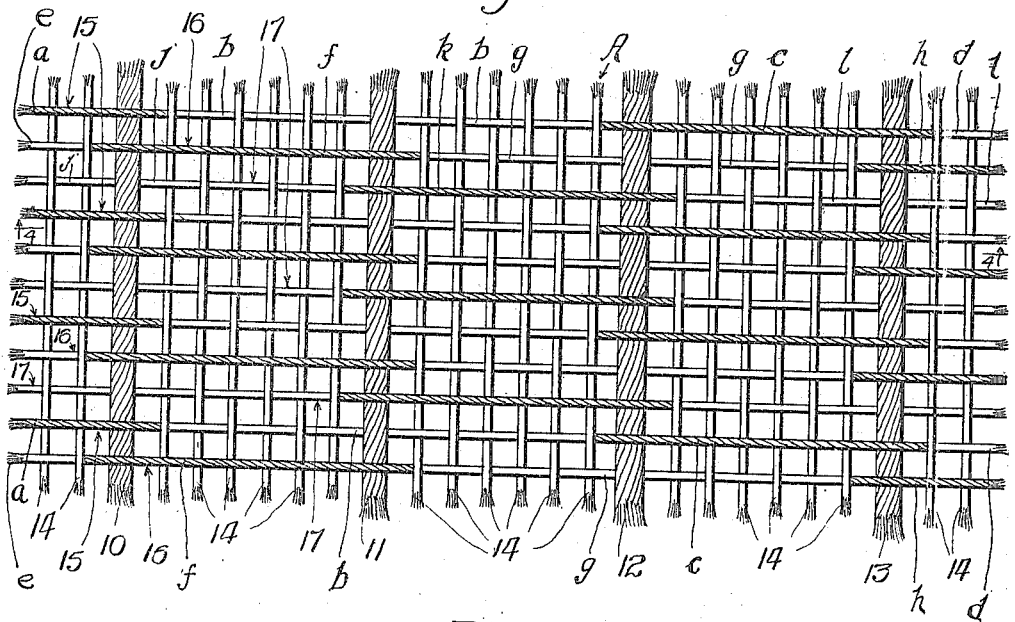
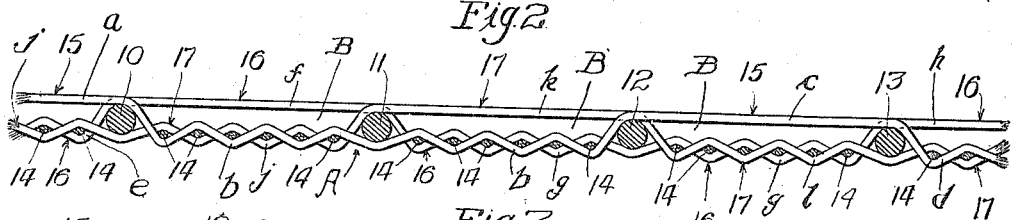
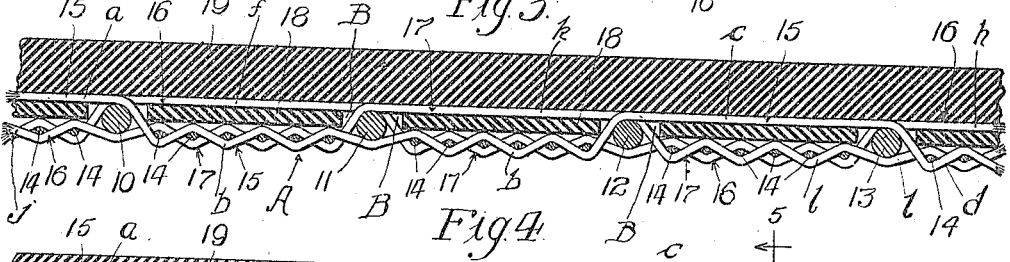
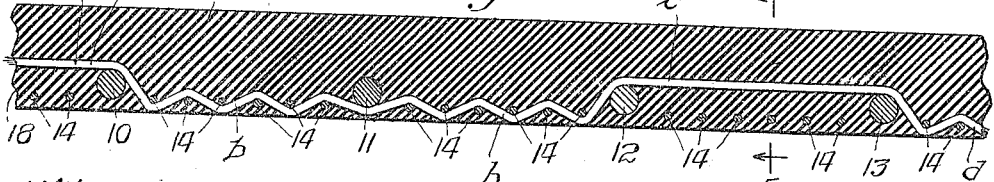
Witnesses:
Harry S. Gaither
Eugene C. Warr
Inventor
Leon J. Campbell
by Poole & Cromer
Attys.

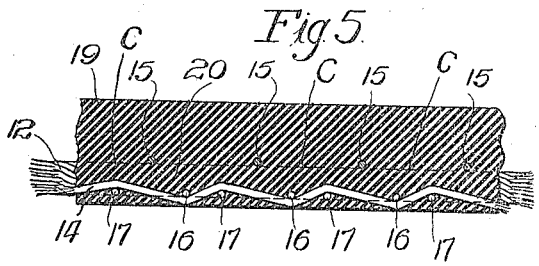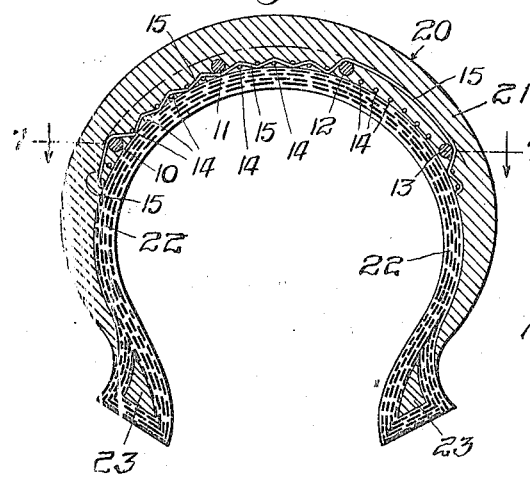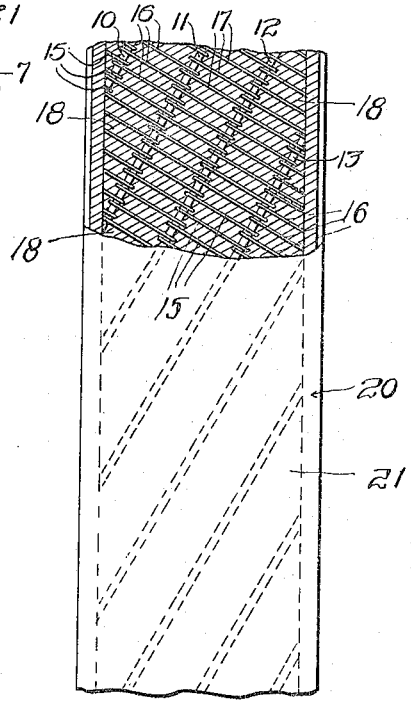

UNITED STATES PATENT OFFICE.

LEON JAY CAMPBELL, OF CHICAGO, ILLINOIS.

FABRIC FOR TIRES.

1,207,709.  Specification of Letters Patent.  Patented Dec. 12, 1916.

Application filed May 25, 1914. Serial No. 840,677.

*To all whom it may concern:*

Be it known that I, LEON J. CAMPBELL, a citizen of the United States, and a resident of Chicago, in the county of Cook and State of Illinois, have invented certain new and useful Improvements in Fabrics for Tires; and I do hereby declare that the following is a full, clear, and exact description thereof, reference being had to the accompanying drawings, and to the letters of reference marked thereon, which form a part of this specification.

This invention relates to a fabric more particularly designed for use in the manufacture of cushion and pneumatic tires and adapted to be interposed between the rubber tread and inner lining of said tires for securely anchoring the rubber tread to said lining and preventing said tread from being stripped therefrom in the travel of the tire over the roadway.

In tires of the type referred to, the rubber treads are usually joined or united with the fabric lining by cement or the like. Such tires are called upon to support exceedingly heavy loads and the rubber treads thereof are subjected not only to the propelling strains but also to severe flexing strains in the use of said tires. Under such strains the treads flex in all directions and pull away or separate from the inner lining and as a consequence becomes stripped from the said lining in the use of the tire.

The fabric embodying the features of my invention is designed to be interposed between the inner canvas casing or lining and the rubber tread of a tire. Said fabric secured to the lining and said rubber tread is united to the fabric, the fabric, therefore, serving to connect the tread with the lining. The tread is permitted to yield in all directions under the propelling and flexing strains without affecting the connection of the tread with the fabric and therefore without affecting the connection of the fabric with the canvas lining. Said fabric prevents the tread and lining from separating and thereby prevents the tread from being stripped from said lining in the travel of the tire over the roadway. In its general features, said fabric is composed of a plurality of laterally spaced longitudinal stout threads having therebetween a set or plurality of longitudinal or warp threads smaller than the stout threads and the warp threads having interwoven therewith a set or plurality of cross or woof threads; said warp and woof threads forming the body of the fabric. Each of the cross threads is provided with a series of loops raised above the body of the fabric and extending between two adjacent stout threads. Each loop extends between at least two stout threads and is above and out of contact with the warp threads between said stout threads. The portions of the cross threads at the ends of each loop are interwoven with the warp threads on each side of the stout threads between which said loops extend. The warp threads below each loop have interwoven therewith a portion of an adjacent cross thread, so as to form the body of the fabric below each loop. The loops of each cross thread extend over and between the same stout threads and said loops, together with said stout threads and the threads of the fabric therebelow form open ended channels adapted to receive fillings of rubber. The manner in which the fabric is used will hereinafter be described.

The invention consists further in the matters hereinafter described and more particularly pointed out in the appended claims.

In the accompanying drawings: Figure 1 is a top plan view on an exaggerated scale of a portion of the fabric woven in accordance with my invention; Fig. 2 is an edge view on a like scale of the fabric shown in Fig. 1; Fig. 3 is a similar view of the fabric and showing the rubber filler strips located in the channels formed by the loops or raised portions of cross threads and the rubber which forms the tread of the tire in position before rubber filler and tread strips are united by vulcanizing; Fig. 4 is a sectional view taken on line 4—4 of Fig. 1 and showing the fabric embedded in the rubber after the tread and filler strips are united; Fig. 5 is a fragmentary sectional view taken on line 5—5 of Fig. 4; Fig. 6 is a vertical sectional view of an outer casing of a pneumatic tire showing a fabric embodying the features of my invention applied as a breaker strip and interposed between and securing the rubber tread to the fabric lining of said tire casing; and Fig. 7 is a sectional view taken on the curved line 7—7 of Fig. 6.

Referring to the drawings, Fig. 1 illustrates on an exaggerated scale a portion of a fabric woven in accordance with my invention. As shown, said fabric A is composed of a plurality of parallel laterally separated longitudinal stout threads 10, 11, 12, 13. Said stout threads are, preferably spaced equal distances apart and are thicker than the other threads of the fabric. Between each of said stout threads are arranged a plurality of longitudinal or warp threads 14, 14 parallel to each other and to said stout threads. Said warp threads 14, 14 are arranged in the same plane as the bottoms of said stout threads. Interwoven with said warp threads 14, 14 to form the body of the fabric are a plurality of parallel cross or woof threads 15, 16, 17, the latter being also interwoven with the said stout threads in the manner presently to be described, so as to secure said stout threads to the body of the fabric. Said stout threads being thicker than the other threads, said stout threads project above the plane of the body of the fabric. The cross or woof threads are interwoven in the following manner: The cross thread 15 extends the full width of the body of the fabric and that portion $a$ thereof constitutes in effect a loop extending between the stout thread 10 and the one to the left thereof. Said loop $a$ extends above and across all of the warp threads 14, 14 between the stout threads just mentioned. The space formed between the loop $a$ and the body of the fabric therebelow is adapted to receive a rubber filler to be hereinafter referred to. One end of said loop $a$ passes from over the top of said stout thread 10 down and around the right side thereof and under the warp thread 14 immediately to the right of said stout thread 10 and continues into a portion $b$ extending between and below the tops of the next two stout threads 11, 12. Said portion $b$ is interwoven with the longitudinal or warp threads 10, 14, 14 between said stout threads 11 and 12. Said portion $b$ passes under the said stout thread 11, as shown. The cross thread 15 then extends upwardly from under the warp thread 14 immediately to the left of the stout thread 12 and passes over said stout thread 12 and extends between the latter and the stout thread 13 to the right thereof. This portion of the cross thread 15 forms another loop $c$ and said loop $c$ is above and extends across all of the warp threads 14, 14 between the stout threads 12 and 13. As in the case of the loop $a$, the loop $c$ forms a space between the same and the body of the fabric therebelow. One end of said loop $c$ passes down and about the stout thread 13 to the right thereof and under the warp thread 14 immediately to the right of said stout thread 13. The remaining portion $d$ of said cross thread is interwoven with the remaining warp threads between the two stout threads to the right of the said stout thread 13 as in the case of the portion $b$ above described. The cross thread 15 is thus interwoven throughout the width of the fabric and has a loop portion raised above the body of the fabric between every three stout threads. The next cross or woof thread 16 has a portion $e$ thereof interwoven with those warp threads 14, 14 between the two stout threads to the left of the said thread 10. Said portion $e$ is interwoven with those warp threads 14, 14 over which the loop $a$ of said cross thread 15 extends. Said cross thread 16 extends upwardly from under the warp thread 14 immediately to the left of the stout thread 10 and then passes in the form of a loop $f$ over and between the stout threads 10 and 11. Said loop $f$ extends across and above all of the warp threads 14, 14 between said stout threads 10 and 11 with the portion $b$ of said cross thread 15 interwoven with the warp threads therebelow. Said loop or raised portion $f$ passes over the top of the stout thread 11, downwardly and under the warp thread 14 immediately to the right thereof and is interwoven with the warp threads 14, 14 between said stout thread 11 and the two stout threads 12, 13 to the right of said stout thread 11. Such portion of said cross thread 16 is indicated by $g$ and the same passes under the stout thread 12 and is interwoven with the warp threads across which the loop $c$ of the cross thread 15 extends. Said portion $g$ passes upwardly from under the warp thread 14 immediately to the left of the stout thread 13, over the top of the same, and extends in the form of a loop $h$ between said stout thread 13 and the one to the right thereof. Said loop $h$ extends over and across all of the warp threads 14, 14 between the stout thread 13 and the one to the right thereof and with which the portion $d$ of said cross thread 15 is interwoven. The next cross thread 17 also extends the full width of the fabric and its portion $j$ is interwoven with the warp threads 14, 14 between the stout thread 10 and the one to the left thereof and also with the warp threads 14, 14 between the stout threads 10 and 11. Said portion $j$ is thus interwoven with the warp threads across which the loop $f$ of the cross thread 16 extends.

The portion $b$ of the cross thread 15 and the portion $j$ of the cross thread 17 are interwoven with the warp threads between the stout threads 10, 11 and such portions together with said warp threads form the body of the fabric below said loop $f$ of the cross thread 16. Such portion $j$ extends upwardly from under the warp thread 14 immediately to the left of the stout thread 11, over the top of the latter and forms a loop or raised portion $k$ which extends between the stout threads 11 and 12 and over and across all of the warp threads between said stout threads 11, 12. The portions $b$ and the portion $g$ of said cross threads 15, 16, respectively, are interwoven with the warp threads across which said loop $k$ extends and constitute with said warp threads the body of the fabric below said loop $k$. Said loop $k$ passes down around to the right of said stout thread 12 and under the warp 14 immediately to the right thereof and continues into the portion $l$ which is interwoven with the warp threads 14, 14 between said stout threads 12 and 13 and the stout thread immediately to the right thereof. As shown, said portion $l$ passes under the stout thread 13. The portion $l$ and said portion $g$ of said cross thread 16 form with the warp threads 14, 14 between said stout threads 12, 13, the body of the fabric below said loop $c$ of said cross thread 15. The next cross thread is interwoven with the warp and stout threads in the same manner as the cross thread 15, and the next two cross threads follow the same path as the two cross threads 16 and 17. In other words, every third cross thread follows the same path.

From the above it will be clear that the set of cross threads are arranged in series, each series comprising three cross threads 15, 16, 17, respectively, and each thread of each series is interwoven in the same manner as the corresponding thread in each series. Each cross thread is interwoven with the longitudinal or warp threads 14, 14 between each three consecutive stout threads to form with the warp threads between said three stout threads the body of the fabric. Each cross thread has a loop or raised portion above the body of the fabric and extending between two stout threads. The body of the fabric below each loop is formed by portions of two adjacent cross threads being interwoven with the warp threads over which said loop extends. The loops are out of contact with the warp and interwoven portions of the adjacent two cross threads and each set of loops between each two stout threads form a channel into which is adapted to be inserted rubber fillers in the form of blocks, strips, or layers in the manufacture of the tire. For instance, the loop $c$ of every cross thread 15 extends between the two stout threads 12, 13 and over and out of contact with the warp threads 14, 14 between said stout threads and the portions $g$, $l$ of the other two adjacent cross threads, are interwoven with said warp threads and form therewith the body of the fabric below said series of loops $c$. The same is true of the other series of loops of each cross thread. The fabric is woven with the cross and warp threads close together or in contact with each other and the body of the fabric is in effect one continuous woven sheet or layer. The loops are close together and form in effect a layer of loops above the body of the fabric with a series of longitudinal channels B, B below said loops and between the stout threads. The loops passing over the stout threads, the latter serve to hold the loops above the body of the fabric. At the sides of the fabric the ends of the alternate warp threads are joined so that said warp threads may be made of one continuous thread. The same is also true of said stout threads. The loops being separated by the portions of the cross threads therebelow, said loops are separated laterally, as shown in Fig. 7.

The fabric woven in the manner as above described and shown in the drawings is used in the manufacture of tires in the following manner: In each channel B, B is inserted a rubber filler block or strip 18. (See Fig. 3.) Said rubber filler block 18 is of such dimensions as to substantially fill the channel B, B into which it is inserted. The loops $a$, $f$, $k$, $c$, $h$ extend across said rubber filler blocks 18, 18 above the same and said blocks are supported by the fabric body below said loops. A sheet of rubber 19 of such length and thickness as to form the tread of the tire is placed flatwise upon the loops, as shown in Fig. 3. Said tread sheet 19 is supported above the body of the fabric by the stout threads and loops, the latter being interposed between the tread strip 19 and the filler blocks 18, 18 and extending lengthwise of said tread strip. The fabric and rubber parts 18, 19 are then subjected to a sufficient heat to vulcanize the rubber and cause the rubber tread 19 and the rubber fillers 18, 18 to unite as one and envelop the loops, as shown in Figs. 4 and 5. The filler blocks soften and completely fill the channels B, B and envelop the stout threads. The rubber also fills the interstices between the interwoven cross and warp threads of the body of the fabric and the latter becomes in effect embedded in the rubber tread of the tire with the outer surface of the fabric body forming the inner bearing surface of the rubber tread. The stout threads project above the body of the fabric, as hereinbefore stated, and form in effect oppositely facing shoulders at each side of the channels B, B. The portions of the rubber tread in said channels abut against said shoulders and the latter serve to prevent lateral shifting of the tread under the transverse strains to which the tread is subjected in its travel over the roadway. Portions of the rubber joining the tread strip 19 and the filler blocks 18, extend between the loops and form in effect rubber tongues C, C separated by the loops. (See Fig. 5.)

Fig. 5 is a view on an exaggerated scale and illustrates the loops $c$, $c$ of the cross threads 15 spaced a considerable distance apart. The fabric is woven closely together and the rubber tongues C, C are much closer together than shown in Fig. 5. Said loops of the threads being embedded in the rubber tread and extending therethrough, as shown, serve to hold the tread to the fabric and prevent the tread from being pulled away from said fabric. Before vulcanizing the rubber, the fabric is united to the upper or outer surface of the inner canvas casing or lining of a tire with the loops uppermost. The rubber tongues C, C permit the body of the tread to yield in all directions without affecting the connection of the tread with said fabric due to the fact that the yielding thus takes place above the body of the fabric which is secured to the inner canvas layer forming the lining of the tire. By permitting the tread to yield in all directions above the body of the fabric the connection of the fabric with the tire lining is relieved of strains, and it follows that said tread does not become separated from the lining and become stripped from the tire, as is the case of tires wherein the tread is cemented to the lining. The tread being secured to the inner canvas casing or lining by said fabric A, said tread is anchored to the canvas casing and separation of the tread and casing or lining under the severe flexing and propelling strains to which the tread is subjected in the travel of the tire over the roadway, is prevented. The loops of the cross threads in addition to performing the function stated, also serve to resist the degree of flexing of the rubber tongues C, C and thus relieve the portions of the tread in the channels B, B of strains.

In Fig. 5 I have shown my improved fabric applied to the outer casing of a pneumatic tire 20. Said fabric is interposed between the rubber tread 21 and the inner canvas casing or lining 22 for securing the tread to said lining. As is usual in tire casings of this character, the lining 22 comprises a plurality of united superposed layers of canvas or the like, the lateral marginal portions of which envelop or inclose the metal or like clencher core pieces 23, 23. My fabric, woven as above described and shown before being applied to the tire, is cut on the bias and to such width as to cover substantially the tread portion of the inner canvas casing 22. Said fabric is secured to said casing 22 by cement or otherwise before the rubber tread 21 is applied thereto. Rubber strips or filler blocks 18, 18 are then inserted in the channels B, B in the manner above described, and the rubber tread 21 is placed over the fabric and blocks 18, 18 and united to the latter by vulcanizing such parts. The tread 21 and rubber filler blocks unite and form the tread of the tire. My fabric is thus embedded in said tread. Said fabric permanently secures the tread 21 to the lining 22, and loosening of the tread from the lining, and stripping of the tread from the lining is prevented. My fabric is shown in said Fig. 5 as a breaker strip, but it is, of course, understood that the same may be cut to such width as to completely surround the canvas lining 22 and secure all portions of the rubber tread to said lining. When the fabric is employed as a breaker strip, as shown in Fig. 5 the portions of the tread 21 on opposite sides of said breaker strip are connected to the bearing surface of the lining 22 on opposite sides of said breaker strip. By securing the rubber tread 21 to the lining or canvas casing 22 by means of my fabric, said tread 21 is permanently secured to the lining and prevented from being stripped from the lining in the travel of the tire over the roadway. The tongues of rubber C, C between the loops unite the rubber tread 21 and rubber blocks 18, 18 in the channels and permit the tread to yield in all directions under the strains to which the same is subjected without affecting the connection of the fabric with the lining 22. The fabric being cut on the bias, the same may be curved to conform to the transverse contour of the tire without bulging at any point in its length or width. Moreover, the fabric being cut on the bias, the stout and longitudinal threads extend diagonally across the tire in one direction. As such threads are secured to the canvas lining at each side of the fabric, should one thread break, the other threads crossing the same will hold. In Fig. 7 is shown, on a slightly exaggerated scale, the positions of the threads when the fabric is cut on the bias and applied to the tire.

An advantage gained in securing the rubber tread to the inner canvas layers by means of fabric woven as above described resides in the fact that the rubber tread may yield in all directions under the severe flexing and propelling without effecting or causing any material strain or pull to be exerted on the points of connection of the rubber tread with the canvas layers of the tire and thereby preventing the separation of the tread from said canvas layers. Moreover, by reason of the stout threads and loops, the outer surface of the fabric is in effect broken or corrugated and the holding surface of the same is increased. Furthermore, the ends of each loop being interwoven with a plurality of warp threads, the cross thread is securely held in the body of the fabric and should any one loop break such broken thread will not be pulled out from the fabric body. The loops of the other cross threads will efficiently serve their purpose notwithstanding the fact that one cross thread has broken.

Although I have shown and described one specific way in which my fabric may be woven, yet it is to be understood that the specific manner in which the threads are interwoven may be variously changed and modified without departing from the spirit or scope of my invention, and I do not wish to be limited to the exact details of the weave of the fabric, except as pointed out in the appended claims.

I claim as my invention:

1. A fabric, comprising a body composed of laterally spaced, relatively stout threads, and interwoven warp and woof threads, said woof threads having loops, each extending between said stout threads and over and out of contact with the body of the fabric between said stout threads; the portions of the woof threads at the extremities of each loop being interwoven with the warp threads, and said loops forming with the body of the fabric a channel adapted to receive a layer of rubber or the like.

2. A fabric, comprising a body composed of a plurality of laterally spaced relatively stout threads, a plurality of warp threads located between said stout threads, and a plurality of woof threads interwoven with said warp threads; said woof threads having loops each extending over and between said stout threads and out of contact with those interwoven warp and woof threads between said stout threads.

3. A fabric, comprising a body composed of two laterally spaced relatively stout threads, a plurality of warp threads parallel to and arranged between and on opposite sides of said stout threads and a plurality of woof threads interwoven with said warp threads; one of said woof threads having a loop extending between and over said stout threads and out of contact with the warp threads therebetween; the portions of said woof thread at the opposite sides of said loop being interwoven with the warp threads on opposite sides of said stout threads, and another of said woof threads being interwoven with the warp threads between said stout threads.

4. A fabric, comprising a body composed of laterally spaced relatively stout threads, a set of warp threads and a set of woof threads interwoven with said set of warp threads; the threads of one set having loops each extending between and over the stout threads and out of contact with the interwoven warp and woof threads therebetween.

5. A fabric, comprising a body composed of a plurality of relatively stout threads, a set of warp threads and a set of woof threads interwoven with said set of warp threads; the threads of one set being arranged between said stout threads and the threads of the other set having loops each extending between and over said stout threads and out of contact with the interwoven warp and woof threads between said stout threads; each of the threads provided with said loops having a portion extending under at least one stout thread.

6. A fabric for tires, comprising a body composed of a set of warp threads, a set of woof threads interwoven with said set of warp threads and a plurality of relatively stout threads, spaced apart and projecting above the body of said fabric; the threads of one set having loops, each extending over and between said stout threads, and out of contact with the interwoven warp and woof threads between said stout threads; said loops forming with said stout threads and body of the fabric a channel adapted to receive layers of rubber or the like.

7. A fabric for tires, comprising a body composed of interwoven warp and woof threads and relatively stout threads, spaced apart and projecting above the body of the fabric; said fabric being provided with loops extending above the body thereof, and forming with the body of said fabric channels adapted to receive layers of rubber or the like; the opposite extremities of said loops being interwoven with the body of said fabric.

8. A fabric for tires, comprising a body composed of a set of warp threads and a set of woof threads interwoven with said set of warp threads; the threads of one set having loops, each extending across and out of contact with a thread of the other set, said loops being arranged in rows and the loops of each row being laterally spaced apart, said loops forming with the body of the fabric therebelow a channel adapted to receive a layer or strip of rubber.

9. A fabric for tires, comprising an upper layer and a lower layer, the latter being formed of interwoven warp and woof threads, the upper layer consisting of a plurality of rows of loops formed of portions of the threads in the lower layer, said row of loops being separated by relatively stout threads forming with said loops and the interwoven portions of the lower layer therebelow channels adapted to receive layers of rubber or the like.

In testimony that I claim the foregoing as my invention I affix my signature in the presence of two witnesses, this 19th day of May A. D. 1914.

LEON JAY CAMPBELL.

Witnesses:
MAURICE D. HERMAN,
EUGENE C. WANN.